No. 869,292. PATENTED OCT. 29, 1907.
C. W. BRAY.
METHOD OF ROLLING BLACK PLATES AND SHEETS.
APPLICATION FILED FEB. 7, 1903.
5 SHEETS—SHEET 1.
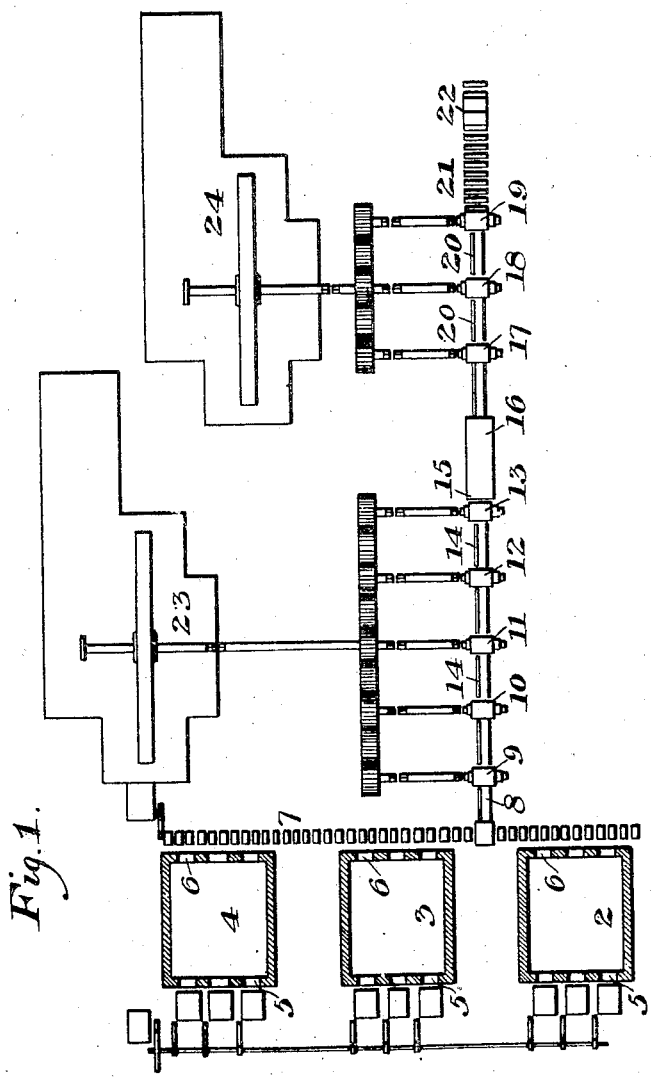
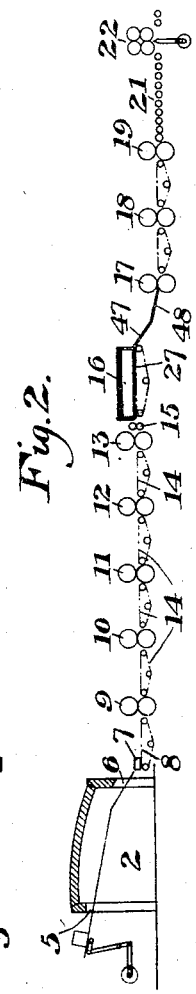
WITNESSES
INVENTOR No. 869,292. PATENTED OCT. 29, 1907.
C. W. BRAY.
METHOD OF ROLLING BLACK PLATES AND SHEETS.
APPLICATION FILED FEB. 7, 1903.
5 SHEETS—SHEET 2.
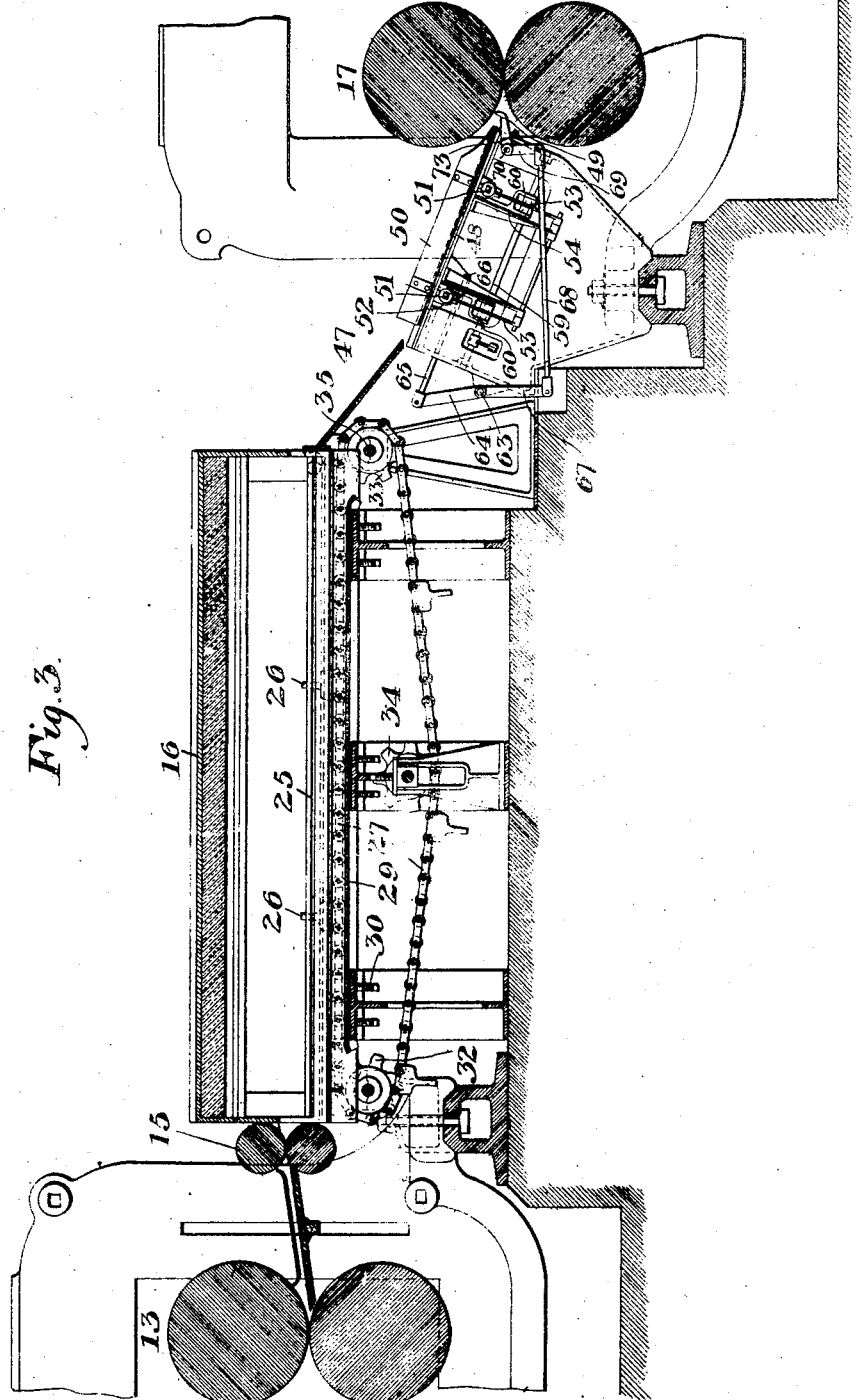
WITNESSES
INVENTOR

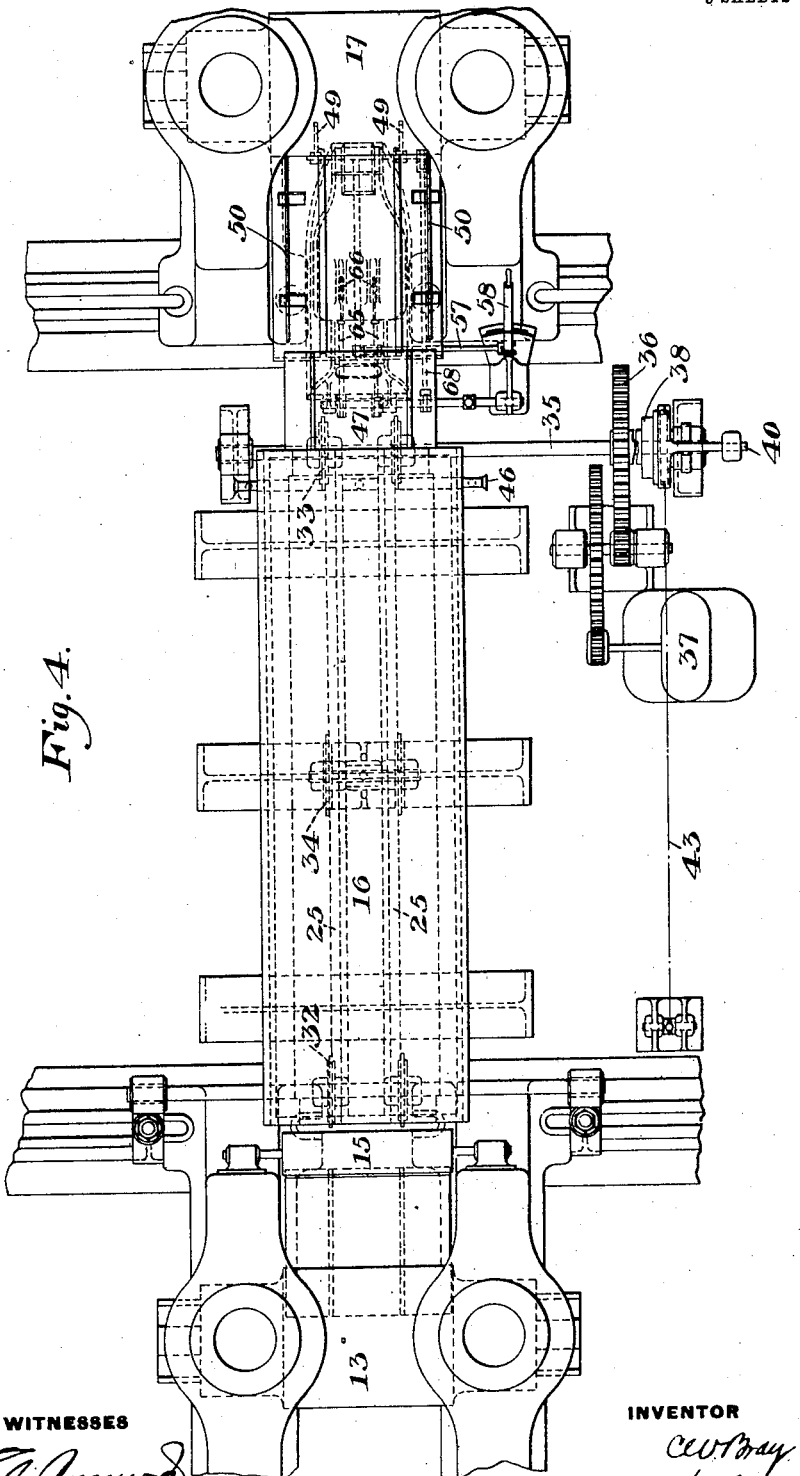

No. 869,292. PATENTED OCT. 29, 1907.
C. W. BRAY.
METHOD OF ROLLING BLACK PLATES AND SHEETS.
APPLICATION FILED FEB. 7, 1903.
5 SHEETS—SHEET 4.
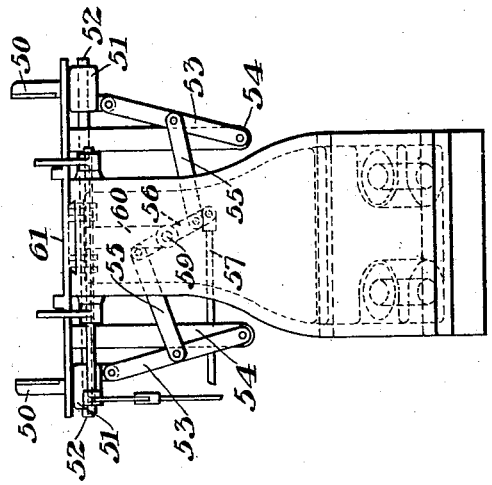
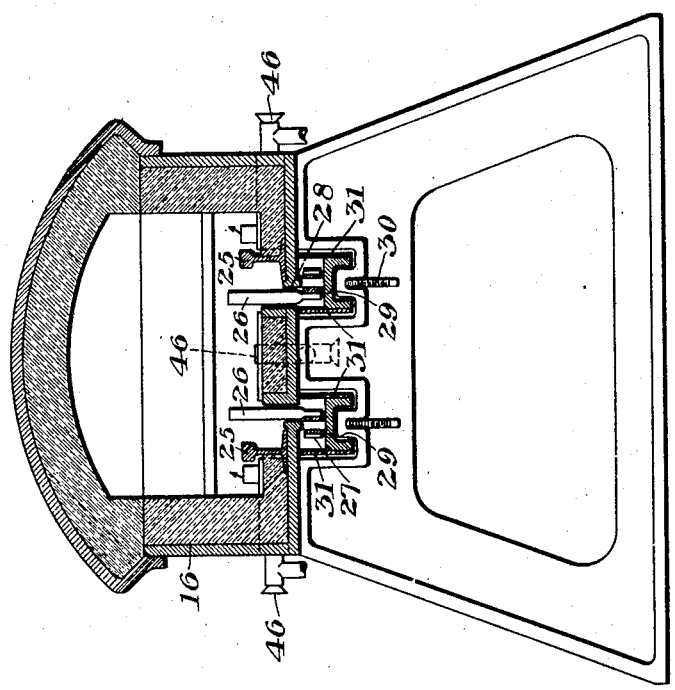
WITNESSES
INVENTOR No. 869,292. PATENTED OCT. 29, 1907.
C. W. BRAY.
METHOD OF ROLLING BLACK PLATES AND SHEETS.
APPLICATION FILED FEB. 7, 1903.

5 SHEETS—SHEET 5.

WITNESSES

INVENTOR

UNITED STATES PATENT OFFICE.

CHARLES W. BRAY, OF PITTSBURG, PENNSYLVANIA, ASSIGNOR TO AMERICAN TIN PLATE COMPANY, OF ORANGE, NEW JERSEY, A CORPORATION OF NEW JERSEY.

METHOD OF ROLLING BLACK PLATES OR SHEETS.

No. 869,292.           Specification of Letters Patent.           Patented Oct. 29, 1907.

Application filed February 7, 1903. Serial No. 142,343.

*To all whom it may concern:*

Be it known that I, CHARLES W. BRAY, of Pittsburg, Allegheny county, Pennsylvania, have invented a new and useful Method of Rolling Black Plates and Sheets, of which the following is a full, clear, and exact description, reference being had to the accompanying drawings, forming part of this specification, in which—

Figure 9:
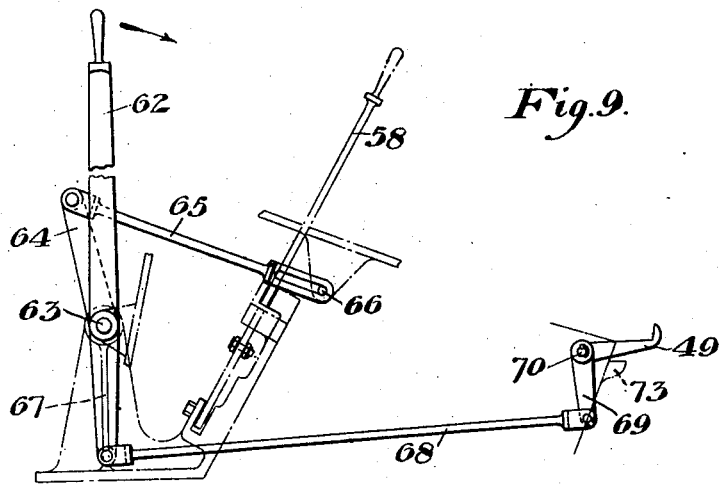
Figure 10:
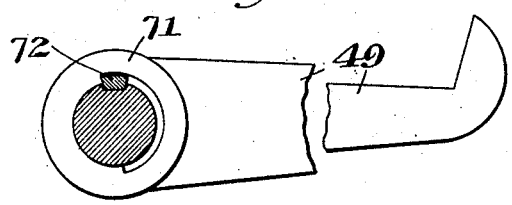
Figure 11:
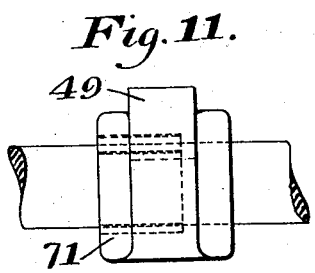
Figure 7:
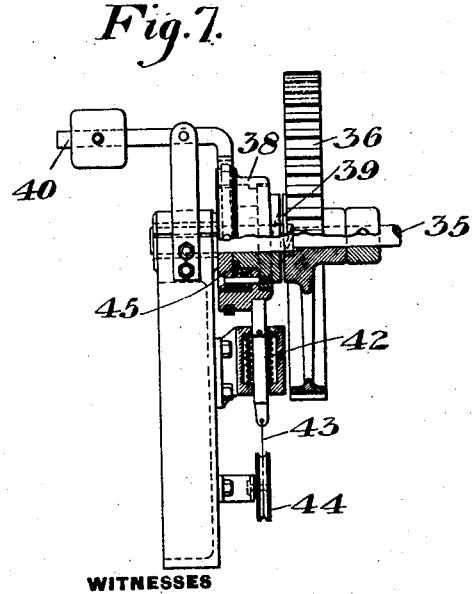
Figure 8:
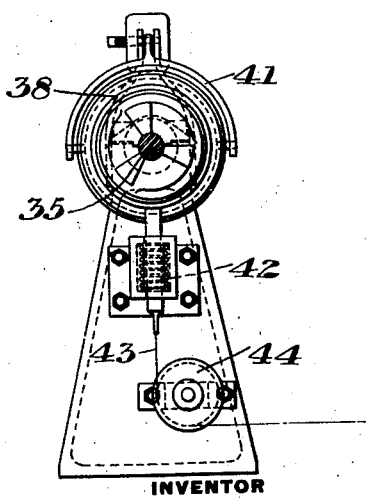

Figure 1 is a diagrammatic plan view, showing the general arrangement of my apparatus. Fig. 2 is a similar side elevation, partly broken away. Fig. 3 is a side elevation on a larger scale, showing a portion of the apparatus including the heating furnace and the matching apparatus. Fig. 4 is a top plan view of Fig. 3. Fig. 5 is a cross-section of the furnace. Fig. 6 is an end elevation of the matching device. Figs. 7 and 8 are detail views of automatic stop mechanism which I preferably employ for the furnace carriers; and Figs. 9, 10, and 11, are detail views showing parts of the matching device.

My invention relates to the rolling of black plates and sheets by passing bars through sets of rolls in tandem, and it is designed to provide an improved method of working wherein the sheets are matched and reheated in the course of their progress in the rolling operation. Claims for the apparatus for carrying out the present method are being prosecuted in applicant's copending application, Serial Number 141,134, filed January 30, 1903. I am thus enabled to use thin bars and to prevent their getting too cold during the rolling operation before forming the pack.

In the drawings, referring to Figs. 1 and 2; 2, 3, and 4 are heating furnaces into which the bars are fed through rear openings 5. The bars which are heated in the furnace are taken out through the front opening 6 to feed-table 7 which lead to a feeding apparatus 8 at the entrance to the continuous or tandem mill. In this mill I have shown five sets of rolls, 9, 10, 11, 12 and 13 arranged in tandem with suitable feeding devices 14 between them. The metal bars after passing through the five successive passes of these rolls, pass between feed-rollers 15 which are positively driven, and which feed the metal into a continuous heating furnace 16. The metal plates are reheated in this furnace, and are piled preferably as they enter the furnace. The packs are thus heated in the furnace and as they issue therefrom are squared up and fed on in the same direction through further sets of tandem rolls, of which I have shown three pairs 17, 18, and 19 with suitable conveyers between them. The packs thence pass over feed table 21 to a doubler which is indicated at 22.

I have shown the mills 9 to 13 as driven from one engine 23 and the mills 17, 18 and 19 are driven from another engine 24. The number of sets of rolls and the manner of driving may be varied without departing from my invention.

Referring now to the reheating furnace which is placed between two of the tandem sets of the mill, this furnace, as shown in Figs. 3, 4 and 5, has an entrance and exit opening at opposite ends, and is provided with two longitudinal supports 25 along which the bars or packs are moved by push-fingers 26. The fingers 26 are secured to endless chains 27, having rollers at the joints of the links, which rollers travel between guides 28 and 29. The fingers are secured to the links between their rollers, so that the rollers bearing upon the lower and upper guides prevent tilting of the fingers when operating upon the packs. The lower guides may be adjusted vertically by set screws or adjusting devices 30; and to prevent air entering the longitudinal bottom slots through which the fingers project, I provide side plates 31 which coact with the bottom guide to inclose each slot throughout the major part of its length, thus forming a shield which prevents air passing up in the furnace. The chains pass over end sprocket wheels 32 and 33, being engaged in its lower path by the adjustable idler 34, which serves to adjust the tension. The wheels 33 are upon the shaft 35, upon which is loosely mounted a toothed wheel 36 having slow motion gearing connections with an electric motor 37; and the shaft carries a clutch device which coacts with a clutch member secured to the wheel 36. The clutch member 38 on the shaft is movable thereon and is normally moved into engagement with the other member 39, forming part of the gear wheel, by weighted lever 40, the two members having coacting crab-faces, and the lever being forked as shown at 41. The member 38 is held in retracted position by a spring-pressed latch 42, which may be pulled back by a cord 43 extending over a lower pulley 44. When this latch is pulled back the weighted lever 40 will cause the two clutch members to engage, and the shaft will revolve for one revolution. It is stopped by the curved cam face 45 on the member 38 which engages the pin and gradually forces back the member 48 during this one revolution. The spring throws the pin inwardly whenever the cord is released. The number of teeth on the sprocket wheels 35 are so proportioned that one revolution of the shaft will move the chains a distance equal to that between the push pins upon them. Hence at each rotation one pack will be moved out of the furnace into the squaring-up device or matcher, while two other packs will be moved forward into successively hotter portions of the furnace, thus leaving a space at the entrance end for the introduction of additional plates to form another pack. The burners 46, or other source of heat, are located at or near the outlet end of the furnace.

The pack or pile fed out of the furnace slides down over the inclined fore-plate 47 and upon an inclined table 48, down which the pile slides until the forward end of the plates contact with stop fingers 49 at the entrance of the pass to the rolls 17. This inclined table of the matcher is provided with squaring-up side guides 50, mounted on arms provided beneath the table with collars 51 which slide upon a transverse shaft 52. The collars are simultaneously moved toward or from each other by means of levers 53 pivoted to supports 54 depending from the table, and connected by links 55 with a two-armed lever 56, to one arm of which is pivoted a connecting rod 57. This connecting rod is connected at its outer end to a hand-lever 58 by which the guides may be simultaneously moved in to square up the plates sidewise, and also to grip the side edges of the pack and hold the plates in proper position as they are fed forward into the next pair of rolls. The shaft 59 has a splined connection with the lever 56 which is moved along it by depending forked supports 60 upon the table when the table is moved endwise. The table is provided with a central dove-tailed guide connection 61 with its supports, and is moved longitudinally by a hand-lever 62 which operates a rock-shaft 63 having a lever 64 with a pivoted link 65, which has a loose slotted connection 66 with a depending bracket on the table. The hand lever 62 is extended at 67 and is connected by pivoted links 68 with a lever 69 secured to a rock shaft 70 having loose connection with the stop finger 49. These stop fingers are provided with collars 71 which are cut out for a portion of their circumference to contain the key 72 on the shaft, so that the shaft may rotate a part of a revolution before it acts upon the fingers. The arrangement is such that when the parts are in their normal position the operator moves in the squaring up side guides which may be held either by the operator or by a notched latch device. The operator then swings the lever 62 in the direction of the arrow (Fig. 7). The keys 72 then move in a clock-wise direction and allow the stops to drop or swing down; and this movement may be assisted by springs if desired. This movement is limited by a stop 73. The further movement of the lever 62 acts through link 65 which has thus far moved idly, to positively move the table, said guides, and packs, forwardly, until the forward end of the pack enters the set of rolls 17. The operator then releases the side guides and the pack feeds forwardly into the pair of rolls with the plates in their correct relative positions.

In carrying out my method, the heated bars are fed singly and successively through the first set of rolls of the tandem mill and then after they have been reduced to a desirable thickness for piling, they are fed into the reheating furnace and either piled therein, or after leaving it and before entering the next pass. I prefer to pile them as they are fed into the furnace, each plate passing through the feed rolls and thence dropping down upon the preceding plates which lie on the rails. When the pack is formed, the operator throws in the clutch and causes the carriers to move the pack forward to the next station in the furnace. At the same time another pack is fed out of the furnace, drops into the matcher, is squared up both endwise and sidewise, and is then fed forward into the succeeding sets of rolls. After the pack of reheated plates is reduced, the packs pass on to the doubler, where they may be doubled or not, according to the gages desired.

The advantages of my invention result from the steps of heating and matching the plates in the same line with the continuous mill, whereby the steps may be rapidly and cheaply carried out. I prefer to place further tandem rolls beyond the heating and matching devices, these sets of rolls being also in the same line of feed so that there are few handlings during the rolling, the packs after the second rolling being for reheating and finishing if lighter gages are desired. The reheating after passing through some of the sets is especially desirable in using lighter bars, though the process may be applied to bars of any desirable thickness.

The matching may be carried out in the furnace, though I prefer to at least square up the pack after heating and before further rolling. The plates may be fed singly to the furnace, and then matched before entering the next pass. The rolls succeeding the furnace may be arranged out of line with the preceding rolls, though I prefer to arrange them in tandem as shown. Many other changes may be made in the form and arrangement of the apparatus, without departing from my invention.

I claim:

The method herein described of reducing metal bars into sheets in pile in a heated state, which consists in first, reducing hot bars to plates by passing the bars between "roughing-rolls," second, collecting while hot the plates thus produced one upon another in pile within a heating-furnace and finally transferring and subjecting such pile so heated and while hot to the action of rolls to reduce the plates therein to sheets; substantially as described.

In testimony whereof, I have hereunto set my hand.

C. W. BRAY.

Witnesses:
GEO. B. BLEMING.
H. M. CORWIN.